US010376846B2

(12) United States Patent
Ding et al.

(10) Patent No.: US 10,376,846 B2
(45) Date of Patent: Aug. 13, 2019

(54) COMPOSITE PERFLUOROHYDROCARBON MEMBRANES, THEIR PREPARATION AND USE

(71) Applicant: L'Air Liquide, Societe Anonyme pour l'Etude et l'Exploitation des Procedes Georges Claude, Paris (FR)

(72) Inventors: Yong Ding, Wayland, MA (US); Benjamin Bikson, Brookline, MA (US)

(73) Assignee: POROGEN CORPORATION, Houston, TX (US)

( * ) Notice: Subject to any disclaimer, the term of this patent is extended or adjusted under 35 U.S.C. 154(b) by 24 days.

(21) Appl. No.: 15/478,923

(22) Filed: Apr. 4, 2017

(65) Prior Publication Data
US 2017/0203257 A1 Jul. 20, 2017

Related U.S. Application Data

(60) Continuation of application No. 12/979,565, filed on Dec. 28, 2010, now Pat. No. 9,610,547, which is a division of application No. 11/744,018, filed on May 3, 2007.

(60) Provisional application No. 60/797,521, filed on May 4, 2006.

(51) Int. Cl.
B01D 69/12 (2006.01)
B01D 71/32 (2006.01)
B01D 71/38 (2006.01)
B01D 71/78 (2006.01)
B29C 67/20 (2006.01)
B29C 71/02 (2006.01)
B29K 71/00 (2006.01)
B29L 31/00 (2006.01)
B29K 105/04 (2006.01)

(52) U.S. Cl.
CPC ............ B01D 69/12 (2013.01); B01D 71/32 (2013.01); B01D 71/38 (2013.01); B01D 71/78 (2013.01); B29C 67/202 (2013.01); B29C 71/02 (2013.01); B01D 2323/18 (2013.01); B01D 2325/34 (2013.01); B29C 2071/022 (2013.01); B29K 2071/00 (2013.01); B29K 2105/041 (2013.01); B29L 2031/755 (2013.01); Y02P 20/132 (2015.11)

(58) Field of Classification Search
None
See application file for complete search history.

(56) References Cited

U.S. PATENT DOCUMENTS

| 4,721,732 A | 1/1988 | Dubrow et al. |
| 4,754,009 A | 6/1988 | Squire |
| 4,957,817 A | 9/1990 | Chau et al. |
| 4,992,485 A | 2/1991 | Koo et al. |
| 5,051,114 A | 9/1991 | Nemser et al. |
| 5,064,580 A | 11/1991 | Beck et al. |
| 5,089,192 A | 2/1992 | Costa |
| 5,200,078 A | 4/1993 | Beck et al. |
| 5,205,968 A | 4/1993 | Damrow et al. |
| 5,227,101 A | 7/1993 | Mahoney et al. |
| 5,260,415 A | 11/1993 | David |
| 5,651,931 A | 7/1997 | Bailey et al. |
| 5,876,604 A | 3/1999 | Nemser et al. |
| 5,997,741 A | 12/1999 | Shimoda et al. |
| 6,017,455 A | 1/2000 | Shimoda et al. |
| 6,406,517 B1 | 6/2002 | Avery et al. |
| 6,540,813 B2 | 4/2003 | Nelson et al. |
| 6,544,316 B2 | 4/2003 | Baker et al. |
| 6,887,408 B2 | 5/2005 | Yuan |
| 7,176,273 B2 | 2/2007 | Yuan et al. |
| 2006/0094852 A1 | 5/2006 | Yuan et al. |

FOREIGN PATENT DOCUMENTS

| EP | 0 737 506 | 10/1996 |
| JP | 3-273038 | 12/1991 |

OTHER PUBLICATIONS

Franchina, N., et al., "Surface Modifications of Poly(ether ether ketone)," Macromolecules, vol. 24, pp. 3045-3049, 1991.
Henneuse-Boxus, C., et al., "Surface Functionalization of PEEK Films Using Photochemical Routes," European Polymer Journal, vol. 37, pp. 9-18, 2001.
Laurens, P., et al., "Modifications of Polyether-etherketone Surface after 193 nm and 248 nm Excimer Laser Radiation," Applied Surface Science, vol. 138-139, pp. 93-96, 1999.
Mehta, R.H., et al., "Microporous Membranes Based on Poly(ether ether ketone) via Thermally-induced Phase Separation," Journal of Membrane Science, vol. 107, pp. 93-106, 1995.
Noiset, O., et al., "Surface Modification of Poly(aryl ether ether ketone) (PEEK) Film by Covalent Coupling of Amines and Amino Acids through a Spacer Arm," Journal of Polymer Science, Part A., vol. 35, pp. 3779-3790, 1997.
Sonnenschein, M.F., "Hollow Fiber Microfiltration Membranes from Poly(ether ether ketone) (PEEK)," Journal of Applied Polymer Science, vol. 72, pp. 175-181, 1999.

(Continued)

Primary Examiner — Krishnan S Menon
(74) Attorney, Agent, or Firm — Christopher J. Cronin

(57) ABSTRACT

Composite porous hydrophobic membranes are prepared by forming a perfluorohydrocarbon layer on the surface of a preformed porous polymeric substrate. The substrate can be formed from poly(aryl ether ketone) and a perfluorohydrocarbon layer can be chemically grafted to the surface of the substrate. The membranes can be utilized for a broad range of fluid separations, such as microfiltration, nanofiltration, ultrafiltration as membrane contactors for membrane distillation and for degassing and dewatering of fluids. The membranes can further contain a dense ultra-thin perfluorohydrocarbon layer superimposed on the porous poly(aryl ether ketone) substrate and can be utilized as membrane contactors or as gas separation membranes for natural gas treatment and gas dehydration.

1 Claim, No Drawings

(56) References Cited

OTHER PUBLICATIONS

International Search Report and Written Opinion of the International Searching Authority, dated Jun. 6, 2008, from counterpart International Application No. PCT/US2007/068146, filed on May 3, 2007.
International Preliminary Report on Patentability, dated Nov. 13, 2008, from counterpart International Application No. PCT/US2007/068146, filed on May 3, 2007.

COMPOSITE PERFLUOROHYDROCARBON MEMBRANES, THEIR PREPARATION AND USE

RELATED APPLICATIONS

This application is a continuation of U.S. application Ser. No. 12/979,565, filed Dec. 28, 2010, granted as U.S. Pat. No. 9,610,547 on Apr. 4, 2017, which is a divisional application of U.S. patent application Ser. No. 11/744,018 filed May 3, 2007, which claims the benefit under 35 USC 119(e) of U.S. Provisional application No. 60/797,521, filed on May 4, 2006, all of which are incorporated herein by reference in their entirety.

STATEMENT REGARDING FEDERALLY SPONSORED RESEARCH OR DEVELOPMENT

The invention was made with government support under Grant No. DE-FG02-05ER84250 awarded by the Department of Energy (DOE). The government has certain in the invention.

FIELD OF THE INVENTION

This invention generally relates to composite perfluorohydrocarbon membranes, their preparation and their use.

BACKGROUND OF THE INVENTION

Porous polymeric membranes are well known in the art and are used widely for filtration and purification processes, such as filtration of waste water, preparation of ultra pure water and in medical, pharmaceutical or food applications, including removal of microorganisms, dialyses and protein filtration. Porous polymeric membranes are used to separate components of liquid mixtures by membrane distillation and as contactors to facilitate dissolution of gases in liquids or to remove gases from liquids, as membrane bioreactors, and numerous other applications where they serve as a generic phase separator, for example, as a battery separator. Composite polymeric membranes that consist of a dense separation layer superimposed on porous support are used in gas separations such as natural gas treatment, gas dehydration, and hydrogen recovery from petrochemical and refinery streams. These composite membranes can be further utilized for removal of gases from liquids and for dehydration of liquids. While these membranes have found broad utility for a variety of purposes, they suffer from several disadvantages: broad and non uniform pore size distribution, limited chemical, solvent and thermal resistance, and surface characteristics, in particular when non-wetting, oleophobic properties are required. Porous polyolefin membranes, such as polypropylene and polyethylene membranes, are utilized for membrane and as membrane contactors to promote dissolution or removal of gases from liquids. However, these membranes frequently wet out by the liquid media which leads to reduction in mass transfer and an inferior performance. Porous membranes with improved surface properties are thus required for continuous stable operation of membrane contactors. Furthermore, commercial porous polymeric membranes exhibit limited solvent resistance that limits the scope of their application. Low cost porous polymeric membranes with tailored surface characteristics, uniform pore size distribution, improved thermal stability and solvent resistance are thus still needed.

Poly(aryl ether ketone)s represent a class of semi-crystalline engineering thermoplastics with outstanding thermal properties and chemical resistance. One of the representative polymers in this class is poly(ether ether ketone), PEEK, which has a reported continuous service temperature of approximately 250° C. PAEK polymers are virtually insoluble in all common solvents at room temperature. These properties make PAEK attractive materials for porous membrane preparation. However, application of PAEK polymers to fabrication of membranes has been limited owing to their intractability, which prevents the use of conventional solvent-based methods of membrane casting. PAEK polymers can be chemically modified to impart solubility, for example, by sulfonation. However, articles formed from such functionalized PAEK polymers lose many of the desired properties. Bulk modification leads to a disruption in polymer chain crystallization and articles subsequently former from such functionalized polymers loose solvent resistant properties.

A number of methods to prepare porous PAEK membranes have been disclosed in the art. It is known to prepare porous PEEK membranes from solutions of strong acids, such as concentrated sulfuric acid. However, PEEK can undergo sulfonation in the concentrated sulfuric acid media and thus can loose some of its desirable sought after properties. U.S. Pat. No. 6,017,455 discloses preparation of non-sulfonated porous PEEK membranes from concentrated sulfuric acid solvents sufficiently diluted by water to prevent sulfonation. The membranes are formed by casting PEEK solution to form a film followed by coagulation in a concentrated sulfuric acid. This membrane preparation process is complicated and produces large amounts of waste acid.

U.S. Pat. No. 5,997,741 discloses preparation of porous PEEK membranes by forming a solution of PEEK polymer in a concentrated sulfuric acid at the temperature of 15° C. or lower to prevent sulfonation. The solution is processed and cast at a sub ambient temperature, followed by coagulation in water or in a concentrated sulfuric acid. Only dilute PEEK solutions can be formed in the concentrated sulfuric acid which adversely affects film forming characteristics, the mechanical characteristics, and the pore morphology of the thus formed porous PEEK membranes.

U.S. Pat. Nos. 4,992,485 and 5,089,192 disclose preparation of PEEK membranes from non-sulfonating acid solvents that include methane sulfonic acid and trifluoromethane sulfonic acid. European Patent Specification EP 0737506 discloses preparation of improved polymeric membranes based on PEEK admixtures with polyethylene terephthalate. The membranes are formed by the solution casting process from a methane sulfuric acid/sulfuric acid solvent mixture.

The acid based solvent systems for manufacturing of porous PEEK membranes disclosed in the arm are highly corrosive, frequently toxic and generate substantial environmental and disposal problems. For these and other reasons, the acid based casting processes have found limited commercial use.

An alternative to the acid based solvent system for PEEK membrane preparation involves the use of high boiling point solvents and plasticizers that dissolve PEEK polymer at elevated temperatures. U.S. Pat. Nos. 4,957,817 and 5,064,580, both issued to Dow Chemical Co., disclose preparation of porous PEEK articles from its admixture with organic polar solvents having a boiling point in the range of 191° C. to 380° C., such as benzophenone and 1-chloronaphthalene, and organic plasticizers capable of dissolving at least 10 weight percent of PEEK, respectively. The final porous article is formed by removing the organic polar solvents and/or plasticizers by dissolution into a low boiling temperature solvent. U.S. Pat. No. 5,200,078 discloses preparation of microporous PEEK membranes from its mixtures with plasticizers wherein the membrane undergoes a drawing step prior to or after the plasticizer is removed by leaching. U.S. Pat. No. 5,227,101 issued to Dow Chemical Co. discloses preparation of microporous membranes from poly(aryl ether ketone) type polymer by forming a mixture of PEEK type polymer, a low melting point crystallizable polymer, and a plasticizer, heating the resulting mixture, extruding or casting the mixture into a membrane, quenching or coagulating, the membrane and leaching the pore forming components. U.S. Pat. No. 5,205,968, issued to Dow Chemical Co., discloses preparation of microporous membranes from a blend containing a poly(aryl ether ketone) type polymer, an amorphous polymer and a solvent.

M. F. Sonnenschein in the article entitled "Hollow fiber microfiltration membranes from poly(ether ether ketone)", published in the Journal of Applied Polymer Science, Volume 72, pages 175-181, 1999, describes preparation of PEEK hollow fiber membranes by thermal phase inversion process. The use of a leachable additive polymer, such as polysulfone, is proposed to enhance membrane performance. Preparation of porous PEEK membranes by coextrusion of PEEK with polysulfone polymers followed by the dissolution of the polysulfone polymer from the interpenetrating network is disclosed in European Patent Application 409416 A2.

It is also known in the art to prepare porous PEEK membranes from its blends with a compatible poly(ether imide) polymer, PEI. Preparation of such membranes is described by R. S. Dubrow and M. F. Froix in U.S. Pat. No. 4,721,732 and by R. H. Mehta et al. in an article entitled "Microporous membranes based on poly(ether ether ketone) via thermally induced phase separation", published in the Journal of Membrane Science, Volume 107, pages 93-106, 1995. The porous structure of these PEEK membranes is formed by leaching the poly(ether imide) component with an appropriate strong solvent such as dimethylformamide. However, as described by Mehta et al., the quantitative removal of PEI component by leaching is essentially impossible which in turn can lead to an inferior membrane performance.

Japan Kokai Tokkyo Koho 91273038 assigned to Sumitomo Electric Industries, Ltd., discloses preparation of porous PEEK membranes by an ion track etching method.

M. L. Bailey et al, in U.S. Pat. No. 5,651,931 describe a sintering process for the preparation of biocompatible filters, including PEEK filters. The filters are formed from a PEEK powder of a pre-selected average particle size by first pressing the powder into a "cake" followed by sintering in an oven or furnace. The process is limited to preparation of filters with a relatively large pore size and a broad pore size distribution and does not provide economic means of forming large membrane area fluid separation devices.

A process for preparation of porous PAEK articles that preserves the desirable thermal and chemical characteristics of PAEK polymers has been recently disclosed in U.S. Pat. No. 6,887,408.

Perfluoropolymers exhibit superior chemical durability and thus are sought after materials for preparation of membranes. Porous perfluoropolymer membranes are utilized for variety of filtration separation applications while non-porous amorphous perfluorpolymres are utilized in gas and vapor separation applications and gas transfer. Commercial porous perfluoropolymer membranes are typically available in a relatively large pore size (above 0.1 micrometer) and suffer from a broad and non uniform pore size distribution that can limit their use as separation membranes and as gas/liquid transfer membranes due to surface wet out. Stand alone porous perfluoropolymer membranes tend to compact under high cross membrane differential pressures due to a relatively low modulus and tensile strength of perfluoropolymers. An attempt to remedy these deficiencies was made by preparing composite perfluoropolymer membranes. U.S. Pat. No. 4,754,009 to Squire discloses a gas permeable material that contains passageways wherein the interior of the passageways is formed by solution coating of perfluoro-2,2-dimethyl-1,3-dioxole, U.S. Pat. No. 6,540,813 to J. K. Nelson et al. discloses preparation of composite membranes from perfluoropolymers by depositing a thin non-occlusive layer of fluoropolymer on the exterior surface of a porous support, U.S. Pat. No. 5,876,604 to Nemser et al. discloses preparation of composite perfluoro-2,2-dimethyl-dioxole membranes that can be useful in gas transfer to and from liquids.

U.S. Pat. No. 5,051,114 to Nemser et al. discloses amorphous a perfluoro-2,2-dimethyl-1,3-dioxole based polymers that can be used for gas separation and gas enrichment applications. U.S. Pat. No. 6,406,517 to D. L. Avery et al. discloses preparation of gas permeable membranes from blend of perfluoropolymers with non-fugitive, non-polymeric fluorinated adjuvant. U.S. Pat. No. 6,544,316 to R. W. Baker et al. discloses gas separation membranes with selective layer formed from fluorinated polymer resistant to plasticization by the organic components in the gas mixture.

The prior art composite perfluoropolymer membranes are formed by depositing a perfluoropolymer onto a porous support. The porous support is typically formed from a conventional polymeric material such as polysulfone or polyetherimide. These porous supports are not sufficiently chemically or thermally resistant and degrade in long term operation. The perfluoropolymer is not attached chemically to the porous support and thus the perfluoropolymer layer can delaminate and the membrane can otherwise develop defects due to the differential thermal expansion of coating and substrate materials and/or substrate swelling when subjected to contact with solvent media or condensable vapor.

Thus there are still remains a need in the art for composite porous perfluoropolymer membranes with a chemically resistant substrate and a uniform narrow pore size distribution with pore diameter below 100 nm.

Poly(aryl ether ketone)s are high performance engineering polymers that exhibit exceptional thermal and chemical characteristics and are thus highly sought after as porous substrates for composite membrane preparation. However, the properties that make PAEK polymers desirable also make preparation of porous membranes difficult. Chemical resistance of PAEK polymers makes the functional modification of the preformed porous article difficult and such functionalized porous PAEK articles are unknown. Preparation of porous PAEK membranes with perfluoro hydrocarbon layers is not known in the art.

A number of techniques have been used in the art to chemically modify the surface of dense PEEK films to affect surface characteristics such as friction, wettability, adsorption and adhesion, including cell adhesion. O. Noiset, et al., have modified the PEEK film surface using wet-chemistry technique by selectively reducing ketone groups to form hydroxyl groups and then covalently fixing hexamethylene diisocyanate by addition onto the hydroxyl function (Journal of Polymer Science, Part A, Vol. 35, pages 3779-3790, 1997). C. Henneuse-Boxus, et al., have modified PEEK film surfaces using photochemical routes (European polymer Journal, Vol. 37, pages 9-18, 2001). P. Laurens, et al., have modified PEEK surfaces with excimer laser radiation (Applied Surface Science, Vol. 138-139, pages 93-96, 1999). N. Franchina and T. McCarthy have modified semi-crystalline PEEK films with carbonyl-selective reagents to induce surface functionality (Macromolecules, Vol. 24, pages 3045-3049, 1991). The surface modified films were robust and unaffected by a variety of solvents. In U.S. Pat. No. 5,260,415 I. David disclosed process for the crosslinking of polymers containing diaryl ketone groups by heating the polymer with alcohol and or alkoxide is enhance chemical resistance.

SUMMARY OF THE INVENTION

Commercially available highly hydrophobic membranes generally are manufactured from perfluorohydrocarbon polymers such as Teflon™. These membranes exhibit non-uniform broad pore size distribution that adversely affects separation efficiency. A broad pore size distribution can result in poor separation by allowing unwanted species to pass through or can lead to a wet out by solvents in the case of membrane contactor applications.

Since most membrane separation applications that utilize hydrophobic membranes require a porous structure of highly uniform pore size, there is a need for highly hydrophobic porous membranes with an average pore size below 1 micron combined with a narrow pore size distribution. A need also exists for commercially scalable process for the preparation of chemically and thermally durable composite membranes such as PAEK based membranes with functional perfluorohydrocarbon surface layer(s), including porous PAEK membranes and use thereof.

In one aspect, the invention is directed to a porous composite membrane with an average pore size below 1 micron comprising a perfluorohydrocarbon layer chemically grafted to a surface of a porous polymeric substrate.

In a specific example of the invention, a composite membrane includes a perfluorohydrocarbon layer on a porous poly(aryl ether ketone) substrate.

The membranes of the invention preferably are highly hydrophobic porous membranes with an average pore sire below 1 micron combined with uniform narrow pore size distribution. The membranes of the invention are composite and are formed by grafting a thin perfluorohydrocarbon layer on a surface of a preformed porous polymeric substrate.

In specific examples, the porous polymeric substrate has an average pore size below 1 micron, preferably below 0.1 micron and a narrow pore size distribution, further described below.

The porous polymeric substrate has reactive surface functional groups to allow for a covalent attachment of functional perfluorohydrocarbons.

The functional perfluorohydrocarbons include polymers and oligomers with a molecular weight of below 10,000 Dalton. Examples of perfluorohydrocarbons containing reactive functional groups include FluoroPel PFC 601 AFA (containing silane reactive groups) and PFC 504A/coE5 (containing epoxide groups), both commercially available from Cytonix Corporation. The porous polymeric substrates with surface hydroxyl groups are particularly preferred for the preparation of composite membranes. The hydroxyl group can be an integral part of the backbone of the polymeric material, such as for example in a cellulose based polymers, ethyl cellulose and regenerated cellulose. Alternatively the hydroxyl groups can be formed by surface modification of the preformed porous polymeric substrate. The surface modification can be carried out by physical or chemical means as well known in the art. Examples of surface hydroxyl group formation by physical methods include plasma treatment and UV irradiation. Examples of surface hydroxyl group formation by chemical means include ozonation and lithiation followed by hydrolyses. Preformed porous polymeric substrates that can be functionalized with surface hydroxyl group by physical or chemical means include substrates made from polysulfone, polyether sulfone, polyimides, polyethylene, polypropylene, poly (dimethyl phenylene oxide) (PPO), polybenzimidazole, polycarbonate, polyester, and the like. The most preferred porous substrates of this invention that provide for preparation of super hydrophobic membranes with nanometer size pores and narrow pore size distribution are formed from poly (aryl ether ketones), PAEK.

In another embodiment, the invention relates to preparing highly hydrophobic PAEK membrane by reacting ketone groups in poly(aryl ether ketone) with perfluorohydrocarbon oligomer or polymer containing primary amino-functional groups, ~$NH_2$.

In a further embodiment, the invention is directed to a method in which the surface of the porous PAEK membrane is functionalized with reactive groups such as hydroxyl groups followed by attachment of functional perfluorohydrocarbons.

In one examples, the surface of PAEK membrane is functionalized by reacting with a primary amine compound containing hydroxyl groups through keto-imine group formation. In another example the surface of PAEK membrane is functionalized by reducing ketone groups of poly (aryl ether ketone) to form hydroxyl groups. The functionalization can be carried out on a pre-formed shaped porous PAEK membrane, or on a surface of a non-porous precursor article that is then subjected to pore formation. In some embodiments the functionalization and pore formation can be carried out simultaneously in a single step process. The hydroxyl groups are then reacted with perfluorohydrocarbon molecules containing functional groups capable of covalent bonding to the surface hydroxyl groups, such as epoxy, isocyanate, acid chloride, silane, triazine and the like functional groups. In some embodiments the functionalized PAEK surface can be reacted with extender groups that then in turn are reacted with functional perfluorohydrocarbon groups. The porous PEAK membrane can be subject to modification throughout the porous structure or selectively at the surface of the porous article only.) The composite porous PAEK membranes with perfluorohydrocarbon functional surface layer can be further coated with perfluoropolymers to form porous or dense ultra-thin surface layers to further affect membrane separation characteristics.

In one preferred method the functionalized porous poly (aryl ether ketone) substrate is prepared by a process comprising: a) forming a blend of poly(aryl ether ketone) polymer with a polyimide; b) forming a shaped article from the blend, for example by extrusion, casting or molding; c) optionally annealing the shaped article; d) forming a porous structure throughout the shaped article while simultaneously functionalizing the surface of the shaped article by bringing the article into contact with a primary amine to simultaneously decompose the polyimide in the shaped article into low molecular weight fragments and to functionalize its surface and removing the low molecular weight fragments from the article. After washing and drying, the porous poly(aryl ether ketone) substrate containing reactive surface groups is reacted with a functional perfluorohydrocarbon to form a membrane.

In another preferred method the porous poly(aryl ether ketone) membrane of this invention is prepared by a multi-step process by forming a porous PAEK substrate, functionalizing the surface of the substrate with reactive groups and then reacting these surface groups with a functional perfluorohydrocarbon. The porous PAEK substrate can be formed by a method comprising: a) forming a blend of poly(aryl ether ketone) type polymer with a polyimide; b) forming a shaped article from the blend by extrusion, casting or molding; c) optionally anneal in the shaped article; d) bringing the shaped article into contact with a primary amine to affect decomposition of the polyimide in the shaped article into low molecular weight fragments under conditions that do not cause functionalization of the poly(aryl ether ketone) polymer with the primary amine; e) removing the low molecular weight fragments from the article; and f) drying the porous poly(aryl ether ketone) article.

The porous PAEK substrate formed by the above described process can be then functionalized in a subsequent step by reacting the porous substrate with a primary amine containing one or more target functional groups including polar groups, such as hydroxyl groups, ~OH, amino groups, ~$NH_2$, ~NHR, ~NRR' and the like. The surface of the porous PAEK substrate can be also functionalized to form ~OH groups by reducing ketone groups in the poly(aryl ether) polymer backbone. The membrane of present invention is then prepared by reacting surface groups with perfluorohydrocarbon containing reactive functional groups, such as epoxy, isocyanate, acid chloride, triazine or silane groups, capable of forming covalent bonds with the reactive surface groups. The porous PAEK substrate can be subjected to modification by the primary amine reagent or selective surface reduction throughout the porous structure or selectively at the surface of the porous substrate only. Composite PAEK membranes can be prepared by functionalizing the exterior surface of the porous PAEK substrate only.

Functional perfluorohydrocarbons include oligomers and polymers. Furthermore, they may include mixtures of functional perfluorohydrocarbons with soluble perfluoropolymers. Mixtures of functional oligomers with non-functional polymers can be further utilized. The molecular weight of oligomers can range from several hundred to several thousand and can be as high as 10,000 Dalton.

According to a further embodiment of the present invention, the above objectives and other objectives that are apparent to those skilled in the art are achieved by a method for separating a fluid mixture into a fraction enriched in a first component and a fraction depleted in the first component, comprising the step of contacting said fluid mixture with a fluid separation membrane while maintaining partial pressure differential across the membrane, the membrane having been formed by a process which includes forming a perfluoro hydrocarbon layer on the surface of a porous poly(aryl ether ketone) membrane, whereby the fraction enriched in the first component and the fraction depleted in the first component are generated by preferentially permeating a portion of the fluid mixture through the fluid separation membrane.

The invention has many advantages. For instance, it provides a simple, cost effective, and industrially feasible process for the preparation of composite porous PAEK membranes, modified with a perfluorohydrocarbon surface layer. The composite membranes exhibit improved uniform pore structure, are solvent resistant and can operate at high temperatures. The composite porous PAEK membranes disclosed herein can be utilized as fluid separation membranes, for instance as microfiltration, nanofiltration, ultrafiltration, gas separation, membrane distillation and as membrane contractors. PAEK membranes including a dense perfluorohydrocarbon layer superimposed on the porous PAEK support have improved gas/vapor separation characteristic and high chemical durability.

The above and other features of the invention including various novel details of construction and combinations of parts, and other advantages, will now be more particularly described with reference, to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWING

Not applicable

DETAILED DESCRIPTION OF THE PREFERRED EMBODIMENTS

The invention generally relates to composite membranes, their preparation and their use.

In preferred embodiments, the membranes of the invention are highly hydrophobic porous membranes with an average pore size below 1 micron combined with uniform narrow pore size distribution.

In specific examples, the porous polymeric substrate has an average pore size below 1 micron, preferably below 0.1 micron and a narrow pore size distribution, further described below.

The pore size distribution of the porous substrate of this invention has a ratio the pore diameter of the 90th percentile of the smallest pores in the distribution to the diameter of the 10th percentile of the smallest pores less than or equal to 5. Preferably, the pore size distribution has a ratio of the pore diameter of the 90th percentile of the smallest pore size to the diameter of the 10th percentile of the smallest pore size less than or equal to 3. Most preferably, the pore size distribution would have ratio of the diameter of the 90th percentile of the smallest pore size to the diameter of the 10th percentile of the smallest pore size less than or equal to 2.

Geometric Standard Deviation (GSD) can also be used, to, characterize pore size distribution, GSD calculations involve determining the effective cutoff of pore diameter (ECD) at the point corresponding to the cumulative pore number of the smallest diameter of less than 15.9% and the effective cutoff of pore diameter (ECD) at the point corresponding to the cumulative pore number of the smallest diameter of less than 84.1%. GSD is equal to the square root of the ratio of the ECD of the 84.17 percentile to the ECD of the 15.9 percentile The GSD has a narrow pore size distribution when GSD is less than 2.5, more preferably less than 1.8.

The membranes of the invention are composite membranes that are formed by grafting a thin perfluorohydrocarbon layer on a surface of a preformed porous polymeric substrate.

The perfluorohydrocarbon preferably forms a contiguous ultra-thin surface layer that can be several hundred angstroms thick or less. In some embodiments the perfluorohydrocarbon thrills a monolayer. The porous substrate can be grafted by the perfluorohydrocarbon reagent throughout the porous structure or selectively at the surface of the porous substrate only.

In one aspect, the invention relates to the reparation of composite hydrophobic porous polymeric membranes formed by grafting a thin perfluorohydrocarbon layer on a surface of a preformed porous polymeric substrate.

The porous substrate is preferably formed from a poly(aryl ether ketone) polymer, including poly(ether ketone), poly (ether ether ketone) and poly(ether ketone ketone), collectively referred to as poly(aryl ether ketone), PAEK. The method of instant invention provides preparation of porous PAEK membranes modified with perfluorohydrocarbon functional surface layer to form a composite membrane with improved chemical durability and separation performance. Composite porous PAEK membranes can be prepared with target perfluoro hydrocarbon surface layer formed throughout the porous body of the membrane or the perfluoro hydrocarbon modification can be limited to the surface of the porous membrane only. In one embodiment of this invention the porous PAEK membrane is formed first followed by the surface functionalization with perfluoro hydrocarbon. In another embodiment this invention, a porous PAEK membrane formed by functionalizing the surface of a non-porous PAEK article first followed by the formation of the internal porous structure. In further embodiment of this invention a composite PAEK membrane is prepared by forming an ultra-thin dense perfluoro polymer separation layer on top of the porous PAEK membrane. The porous PAEK membrane can be in the form of a flat sheet, a tube or a hollow fiber. Composite porous PAEK membranes of this invention can be used for a broad range of applications, including porous membranes for fluid separations, such as microfiltration, nanofiltration, ultrafiltration, as gas separation membrane for natural gas treatment and as dehydration, as membrane bioreactors, and as membrane contactors for membrane distillation and degassing of fluids.

The preferred composite membranes of this invention are prepared by forming a perfluorohydrocarbon layer on top of a porous PAEK substrate. Preferably the perfluorohydrocarbon layer is chemically attached to the substrate. Perfluoropolymers with functional amino groups can be utilized to react with ketone groups in the backbone of poly(aryl ether ketone) polymer.

In another embodiment of this invention the surface or the porous PAEK substrate functionalized with reactive groups such as hydroxyl groups or amino groups to which functional perfluorohydrocarbons are attached in a subsequent step. In one such example the surface of PAEK substrate is functionalized reacting with a primary amine compound containing hydroxyl groups through keto-imine group formation. In another example the surface of PAEK substrate is functionalized by reducing surface ketone groups to form hydroxyl groups. The hydroxyl groups are then reacted with perfluorohydrocarbon molecule containing functional groups capable of covalent bonding to the surface hydroxyl groups, such as epoxy, isocyanate, acid chloride, silane, triazine and the like functional groups. In some embodiments the functionalized PAEK surface can be reacted with extender groups that then in turn are reacted with functional perfluorohydrocarbon groups. The porous PEAK membrane can be subject to modification throughout the porous structure or selectively at the surface of the porous article only. The functionalization can be carried out on a pre-formed shaped porous PAEK substrate, or on a surface of a non-porous precursor article that is then subjected to pore formation. In some embodiments the functionalization and pore formation can be carried out simultaneously in a single step process.

Functionalized PAEK articles, their preparation and use are disclosed in U.S. Pat. No. 7,176,273, with the title "Functionalized Porous Poly(Aryl Ether Ketone) Materials and Their Use", issued on Feb. 13, 2007, the teachings of which are incorporated herein by reference in their entirety.

The preferred functionalized porous PAEK membranes of this invention are semi-crystalline. Namely, a fraction of the poly(aryl ether ketone) polymer phase is crystalline and is not subject to modification. A high degree of crystallinity is preferred since it imparts solvent resistance and improves thermo-mechanical characteristics to the article. In some embodiments of this invention the degree of crystallinity is at least 1%, preferably at least 25%, most preferably at least 40%. When pre-formed, shaped porous substrates are utilized to form the functionalized membranes of this invention, the porous substrate can be formed by any method known in the art.

The porous substrate is comprised of a poly(aryl ether ketone) or a blend of poly(aryl ether ketone)s of the following general formula: [—Ar'—CO—Ar"]$_n$ wherein Ar' ad Ar" are aromatic moieties, wherein at least one aromatic moiety contains a diarylether or diarylthioether functional group which is a part of the polymer backbone, and wherein n is integer from 20 to 500.

Preferably, the poly(aryl ether ketone) is selected from the homopolymers of the following repeat units:

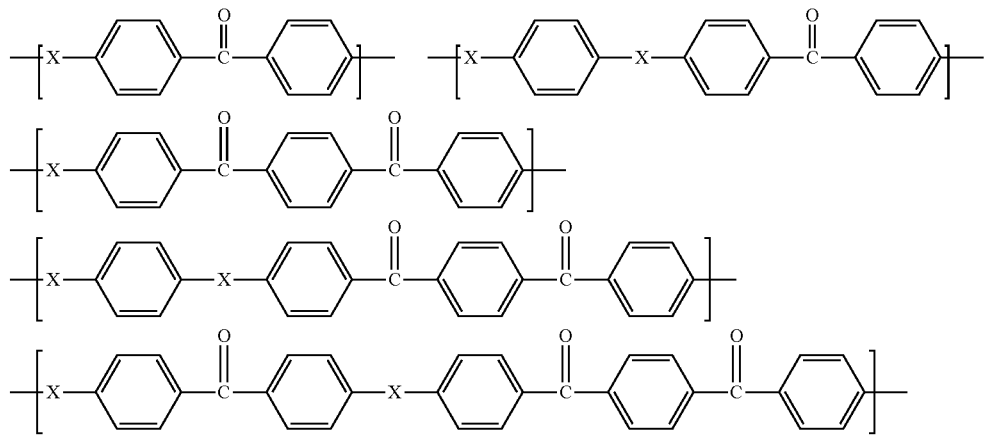

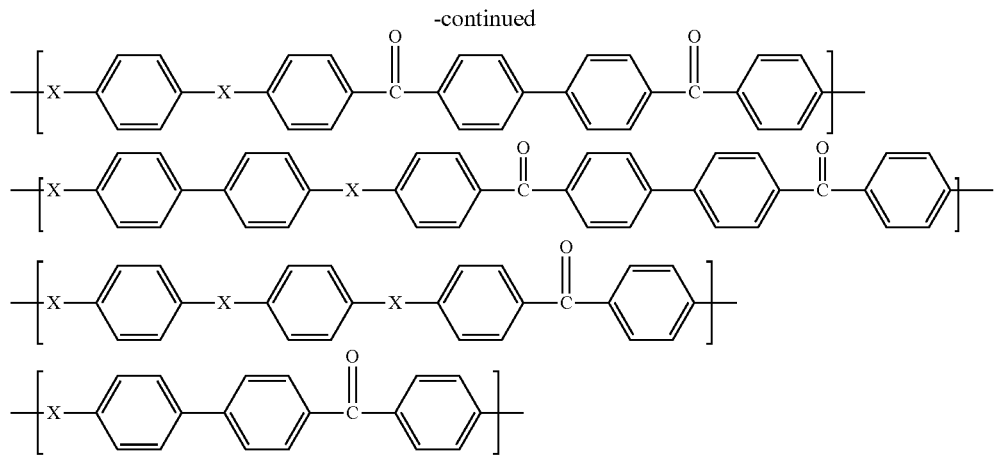

The poly(aryl ether ketone)s typically have a weight average molecular weight in the range of 20,000 to 1,000,000 Daltons typically between 30,000 to 500,000 Daltons.

The preferred poly(aryl ether ketone)s of this invention are semi-crystalline, and are insoluble inorganic solvents at room temperature. The most preferred poly(aryl ether ketone) of this invention poly(ether ether ketone), PEEK, and poly(ether ketone), PEK, both manufacture by Victrex Corporation under the trade name of Victrex® and poly (ether ketone ketone), PEKK, manufactured by Oxford Performance Materials under trade name OXPEKK®.

The preferred method of forming porous PAEK substrate is by melt processing. The preparation of porous poly(aryl ether ketone) substrate typically consists of the following steps:

1. Forming a blend of poly(aryl ether ketone) polymer a porogen by melt blending. The porogen is alternatively a diluent (a high boiling, low molecular weight liquid or solid), an intermediate molecular weight oligomer or a polymer;
2. Forming a shaped article from the blend by melt processing, i.e. extrusion, casting or molding;
3. Solidifying the shaped article by cooling;
4. Removing the porogen (the porogen is typically removed by extraction);
5. Drying the porous PAEK substrate.

Prior to the porogen removal or subsequent to porogen removal the substrate can be annealed to increase the degree of crystallinity of the PAEK phase. The term annealing as defined hereto refers to a processing step or condition that leads to an increase in the degree of crystallinity of the PAEK phase. The annealing can take place during solidification step through control of the cooling rate. For example, the annealing can be carried out in line during extrusion step by controlling the cooling rate. Alternatively or in an addition the annealing can be carried out in a subsequent step after the article has been formed by solidification. In the later case the solidified article can be placed in an oven or transported through a heating zone for a period of time sufficient to affect crystallization. The article can be annealed at a temperature from about 150° C. to about 33° C., preferably from about 200° C. to about 310° C., most preferably from 230° C. to about 300° C. to increase the crystallinity of PAEK phase prior to the removal of the porogen.

The use of polymeric materials as porogens is generally preferred. Examples of polymeric porogens include poly-sulfones, such as poly(ether sulfone), poly(ether ether sulfone), biphenol based polysulfones and bisphenol. A based polysulfone, and polyimides. The most preferred polymeric porogens are polyimides. Poly(aryl ether ketone) type polymers form compatible blends with polyimides, PI. Removal of the polyimide component from such blend article by solvent extraction is, however, very difficult due to polymer chain entanglement. The polyimide can be quantitatively removed, however, by selective chemical decomposition of the polyimide phase to form the final porous article. This method of porous PAEK material preparation is referred to as Reactive Porogen Removal process, RPR.

Polyimides that form the compatible precursor blend with the poly(aryl ether ketone) polymers are defined as polymers containing

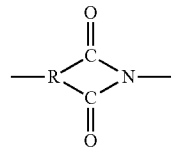

linkages and include aliphatic and aromatic polyimides, copolyimides and polyimide block and graft copolymers, wherein the polyimide is defined as a molecule that contains at least two imide linkages. Additional polyimides include aromatic polyamide includes, polyhydrazine imides and polyester imides.

Aromatic polyimides are particularly useful for the preparation of porous articles of this invention. The preferred aromatic polyimides are described by the following general formula:

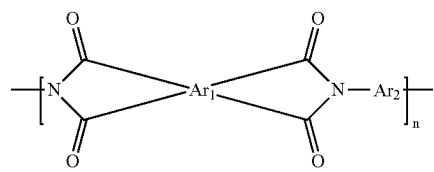

where n is an integer from 2 to 5,000, and where
is independently
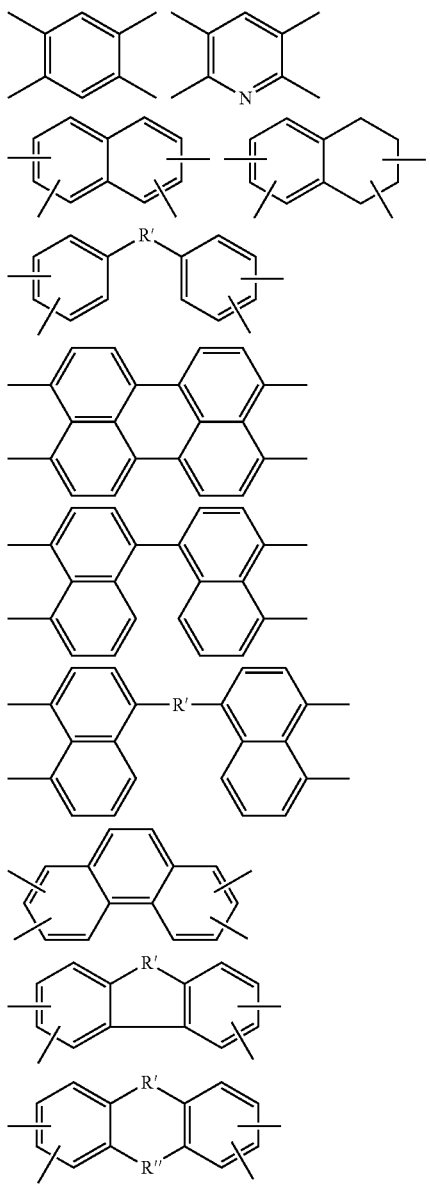
or mixtures thereof.
—R'— is
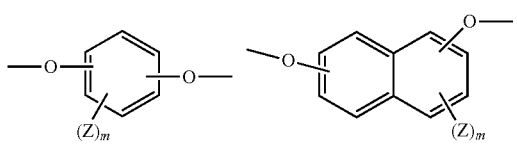
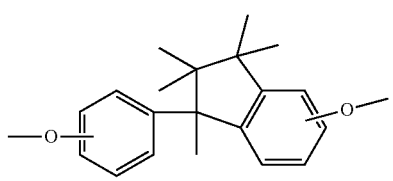
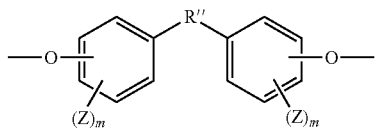
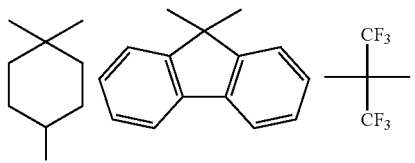
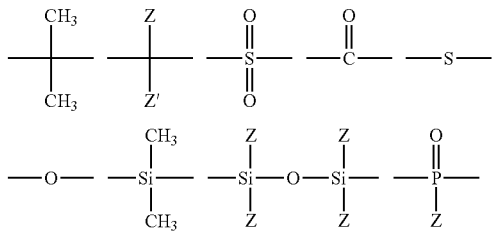
where m equals 0 to 4.
—R''— is
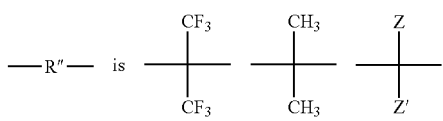
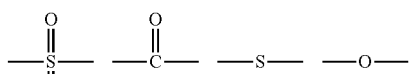
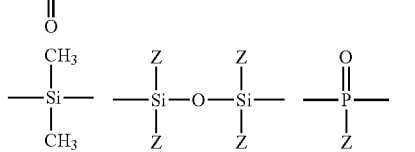
Z and Z' are:
—H, —CH$_3$, —CH$_2$CH$_3$, —CH$_2$CH$_2$CH$_3$, iso-propyl, iso-butyl, tert-butyl, —Br, —Cl, —F, —NO$_2$, —CN
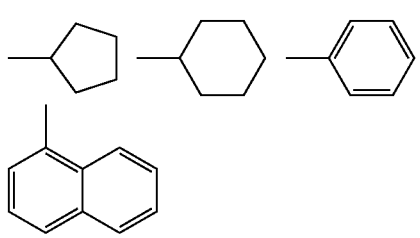

where —Ar$_2$— is independently

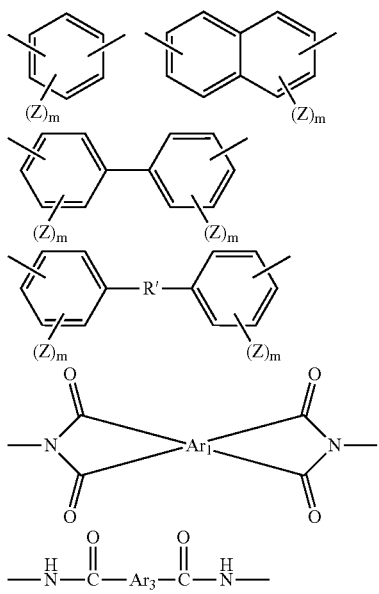

or mixtures thereof, where Ar$_1$ and m are defined as above.

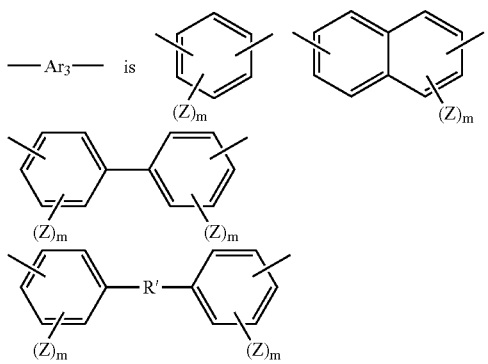

where m is defined above.

The most preferred polyimides are poly(ether imide)s, PEI, of the following formula:

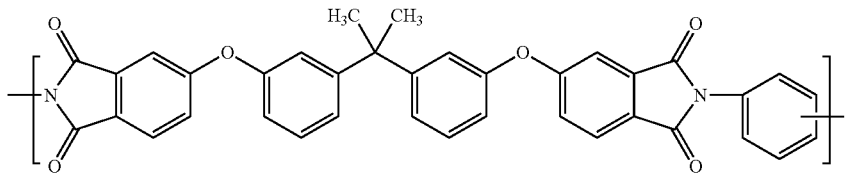

and poly(ether imide) copolymers manufactured by the General Electric Company under the trade name of Ultem® 1000, Ultem® XH1010F, Ultem® 6050 and Siltem® STM1500. The copolymers that contain dimethylsiloxane sulfide units are examples of representative copolymers. Another preferred polyimide is Aurum® manufactured by Mitsui and distributed by DuPont Engineering Polymers.

The polyimides can be used as a single additive component or as a mixture of polyimides. The polyimides typically have a weight average molecular weight in the range of 500 to 1,000,000 Daltons, preferably between 1,000 to 500,000 Daltons.

The formation of the poly(aryl ether ketone) blend with the polyimide can be carried out by mixing components in a molten stage, such as by melt compounding, and other methods conventionally employed in the polymer compounding industry. A plasticizer can be optionally added to aid processing. The thus formed poly(aryl ether ketone)/polyimide blends form compatible blend compositions. The compatible composition is defined as capable of forming porous poly(aryl ether ketone) articles with inter-connected pore structure and an average pore diameter of 10 micrometer or less. Preferred compatible blends are PEEK/PEI blends that form poly(aryl ether ketone) articles with inter-connected pore structure and an average pore diameter of 1 micrometer or less. The most preferred compatible blends are the PEEK/PEI blends that form poly(aryl ether ketone) articles with inter-connected pore structure and an average pore diameter of 100 nanometers or less. The application requirements determine the desired pore size that in turn is determined by the polyimide structure and by the processing conditions.

Blends suitable for preparation of porous articles in accordance with this invention comprise from about 5 to about 95 weight percent of the poly(aryl ether ketone) polymer component, preferably from about 20 to about 75 weight percent of the poly(aryl ether ketone) component, most preferably from 40 to 60 weight percent.

The blends can contain various additives in addition to the compatible polyimide component, including solvents to reduce blend viscosity, stabilizers, flame retardants, pigments, fillers, such as catalytic particles, plasticizers, and the like. Other polymers can be also present in the blend to provide a desired additive property and in particular to modify pore size. One such preferred additive polymer is poly(ether sulfone).

The poly(aryl ether ketone)/polyimide blends can be fabricated into a flat sheet film, a fiber, a hollow fiber or other desired shape precursor substrate by melt extrusion, casting or molding. The article configuration will depend on the intended use. Prior to polyimide phase removal the article is preferably annealed to increase the degree of crystallinity of the PAEK phase. As discussed above, the annealing can take place during solidification step through control of the cooling rate.

The removal of the polyimide component of the blend can be effectively carried out by the RPR process utilizing reagents that decompose the polyimide into low molecular weight easily extractable fragments. The suitable classes of reagents include but are not limited to ammonia, tetraalkylammonium hydroxides, hydrazine, alkylhydrazines, hydroxyalkylhydrazine, primary aliphatic amines, or secondary aliphatic amines. In some embodiments, the reagent that affects polyimide decomposition is diluted with a solvent. Examples of suitable solvents include alcohols, ketones, hydrocarbons, water, and aprotic solvents such as NMP, DMF, and the like. Reagents suitable to decompose the polyimide phase in accordance with this invention include, but are not limited to, ammonia, tetramethylammonium hydroxide, hydrazine, methylamine, ethylamine, propylamine, butylamine, ethylenediamine, propylenediamine, butylenediamine, morpholine, piperazine, monoethanoamine, ethylethanolamine, diethanolamine, propanolamine, diproponalamine, and mixtures thereof. Commercially available amine mixtures, such as Ucarsol®, can be also employed. The preferred amines include hydrimine, monoethanolamine, tetramethylammonium hydroxide, and their mixtures with alcohols, such as methanol, ethanol, isopropanol, butanol, ketones, water, and aprotic solvents. The most preferred reagents for the decomposition of the polyimide phase are the monoethanolamine and the tetramethylammonium hydroxide. The decomposition and removal of the polyimide component can be carried out at an ambient temperature or at elevated temperatures to facilitate the decomposition process and the removal of decomposition products. Preferably the polyimide decomposition process and the removal of the low molecular weight decomposition product are carried out concurrently in a common solvent media. In one embodiment of this invention, the polyimide decomposition and removal process is carried out at from about 50° C. to about 180° C., preferably from about 80° C. to 150° C. The time required to fully decompose polyimide and to remove products of the decomposition process from the article will depend on the shape and the thickness of the article and on process conditions, such as reagent concentration, agitation rate, temperature and the like, as will be recognized by those skilled in the art. The porous poly(aryl ether ketone) articles are then washed with an alcohol, water, or other suitable solvent, and dried. Thus formed substrates are than utilized to prepare membrane of this invention by superimposing perfluorohydrocarbon layers on top of the substrate.

The porous PAEK substrates formed from PEEK blends with poly(ether imide) are characterized by a narrow pore size distribution and frequently exhibit small average pore diameter. The average pore diameter can be below 100 nanometers, and frequently is below 20 nanometers. The porous PEEK substrates with small pore diameter (100 nanometer pore diameter and below) are further characterized by a high specific surface area. The porous PAEK membranes with pore diameter below 100 nm, and surface pores below 20 nm are particularly preferred for preparation of membrane with porous perfluorohydrocarbon surface layers most suited for membrane distillation and liquid degassing applications. It was found surprisingly that porous composite PAEK membranes are super-hydrophobic and can be utilized to separate and recover volatile components from solutions by membrane distillation. In particular, ethanol can be removed from water based solutions selectively. This make composite PAEK membranes of this invention highly suitable for ethanol recovery from fermentation solutions and for production of alcohol free beverages. The composite porous membranes of this invention are further highly suited for recovery of butanol from aceton/butanol/ethanol, ABE, fermentation solutions. The products of fermentation can be removed and recovered from the fermentation solution in a continuous or in a batch process. Considerable reduction in the cost of ethanol butanol production can be attained, when the fermentation process is combined with alcohol extraction from the fermentor. Selective removal of alcohol increases the volumetric productivity of the fermentor, lowers product inhibition and allows higher cell density. It is possible to completely convert a much more concentrated glucose feed into alcohol when alcohol is removed directly from the fermentor, or by recycling the contents of a continuous fermentor through a separation device which retains cell viability by removing alcohol. With less water to carry through the process, and less to remove from the product, the overall cost is reduced.

The composite membrane of this invention can be in the form of a flat sheet film, a tube, a hollow fiber, or any other desirable shape. In the case of hollow fibers, the fiber preferably possess an outside diameter from about 50 to about 5,000 micrometers, more preferably from about 80 to about 1,000 micrometers, with a wall thickness from about 10 to about 1,000 micrometers, preferably from 20 to 500 micrometers. In the case of films, the film preferably possess a thickness of from about 10 to about 1,000 micrometers, most preferably from about 25 to about 500 micrometers. The films may be optionally supported by a permeable cloth or a screen.

It is also within the scope of present invention to form in multilayer composite membranes or membranes with multiple zones that differ in pore size. The multi-zone porous membranes that contain porous zones that differ by at least about 10% in the average pore size or by at least about 5% in the pore volume impart certain advantages to mechanical or separation characteristics of the membrane. For example, the multi-zone porous membranes can provide unproved mechanical properties, exhibit a lower cross membrane pressure drop and exhibit a decreased susceptibility to breach in membrane separation layer. The multi-zone porous membranes are formed from two or more PAEK/porogen blends that differ in blend chemical composition. The blends can, for example, contain different PAEK and polyimide polymer porogen components. Preferably, the chemical composition of individual blends differ in the PAEK/polyimide ratio. The PAEK polymers content of the first blend can differ from the PAEK polymer content of the second and any additional blend by at least 1 weight percent, preferably by at lease 5 weight percent, more preferably by at least 10 weight percent.

The multilayer flat sheet membranes or multilayer membranes of the tubular configuration can contain two, three or more contiguous layers that differ in the average pore size and/or pore volume. Furthermore, the individual layer can vary from about 1% of the overall membrane thickness or less to about 99% of the membrane thickness or more, typically from 10% to 90% or the membrane thickness. The layer comprised of the smaller average size pores can be about 1 micrometer thick or less to about 100 micrometers thick or more and is supported by or sandwiched between layers with a substantially larger average pore size.

One method of forming composite membranes of this invention is to react the preformed PAEK substrate with a perfluorohydrocarbon containing a primary amino group via formation of ketimine linkages as illustrated below:

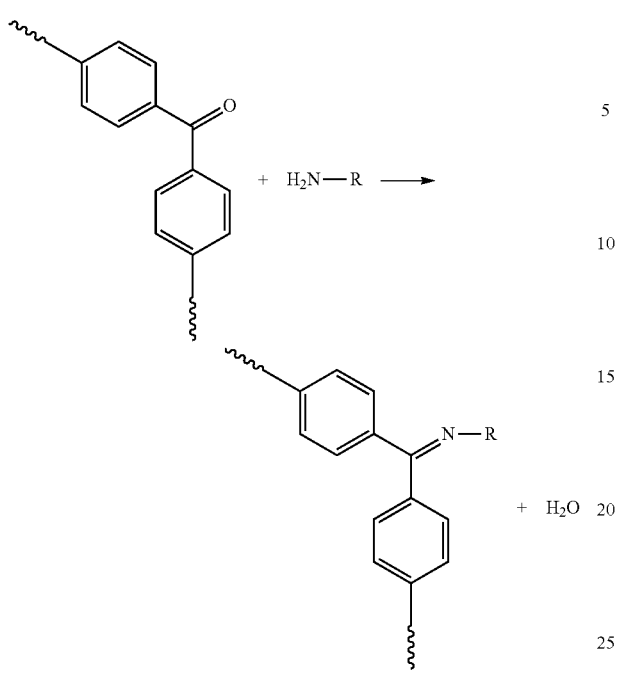

wherein R is a substituted perfluoro radical, —NH—R', or a perfluoro hydrocarbon substituted ethyl radical, —CH$_2$—CH$_2$—R'. Examples of perfluoro hydrocarbon radicals R' include perfluorobutyl, perfluorohexyl, perfluorooctyl, perfluorododecyl, perfluorohexyl, and the like.

To attain optimal surface modification the reaction is preferably carried out in anhydrous conditions at a temperature between 50° C. to 200° C., preferably between 80° C. to 150° C., most preferably between 100° C. and 120° C.

Another preferred method of forming composite membranes of this invention is by reacting the porous PAEK substrate modified with reactive surface groups with a functional perfluorohydrocarbon. The perfluorocarbon group modified PAEK membranes can be prepared by modifying porous PAEK article with an amino-functional perfluorohydrocarbon as described above or by a two step process wherein the porous PAEK article is first functionalized and the functional groups are then reacted with reactive groups in a functional perfluorohydrocarbon. For example, the porous PAEK substrate is functionalized with hydroxyl groups or ≈C=N—CH$_2$CH$_2$OH groups that can be reacted with a perfluorohydrocarbon containing an epoxide group, an isocyanate group or a silane group. Examples of perfluorohydrocarbons containing reactive functional groups include FluoroPel PEC 601AFA (containing silane reactive groups) and PFC 504A/coE5 (containing epoxide reactive groups), both commercially available from Cytonix Corporation. The surface hydroxyl groups can be formed by reducing ketone groups on the surface of PAEK substrate with a reducing reagent such as sodium borohydride or by forming ≈C=N—CH$_2$CH$_2$OH groups by reacting ketone groups with monoethanolamine.

In another embodiment of this invention the surface of the functionally modified PAEK substrate can be sequentially further modified by attaching extender groups by reacting with molecules containing one or more reactive functional groups. Examples of reactive functional group include an epoxide group, an isocyanate group, a silane group or a triazine chloride. A well know isocyanate or trichloro triazine coupling chemistry can be advantageously utilized to conduct the sequential functionalization:

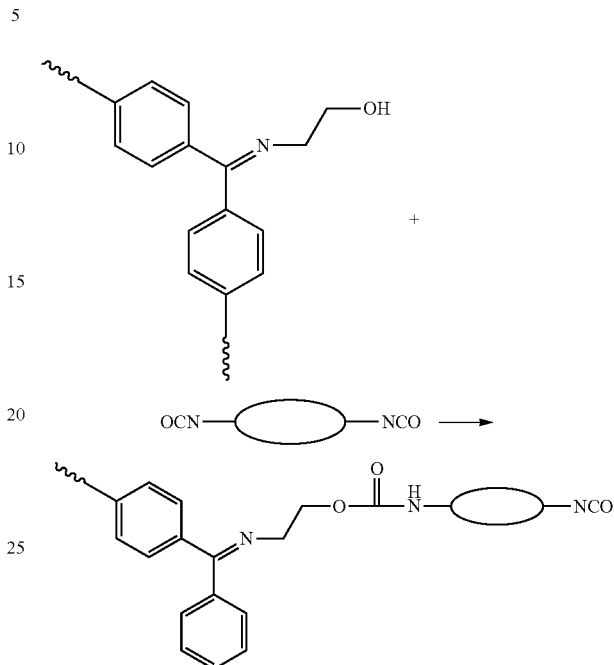

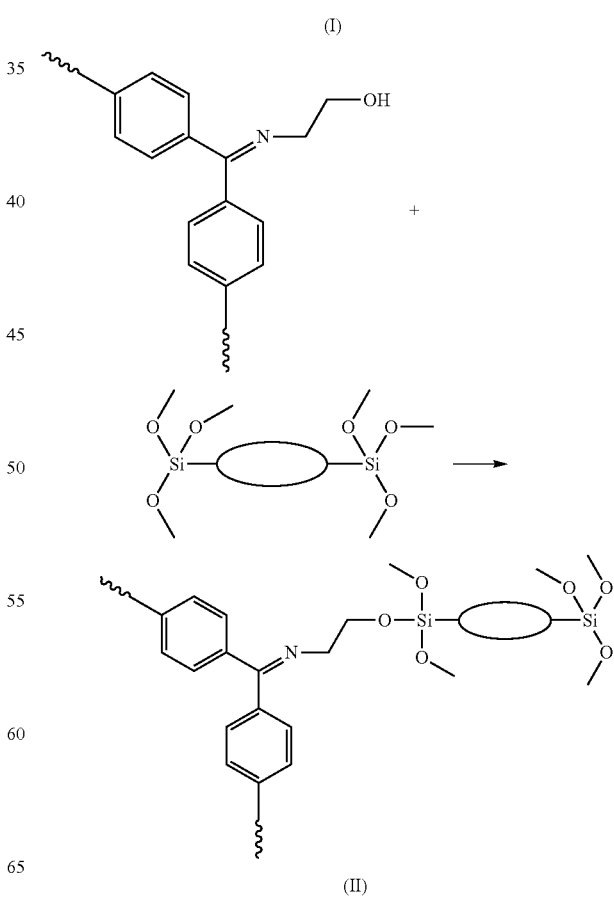

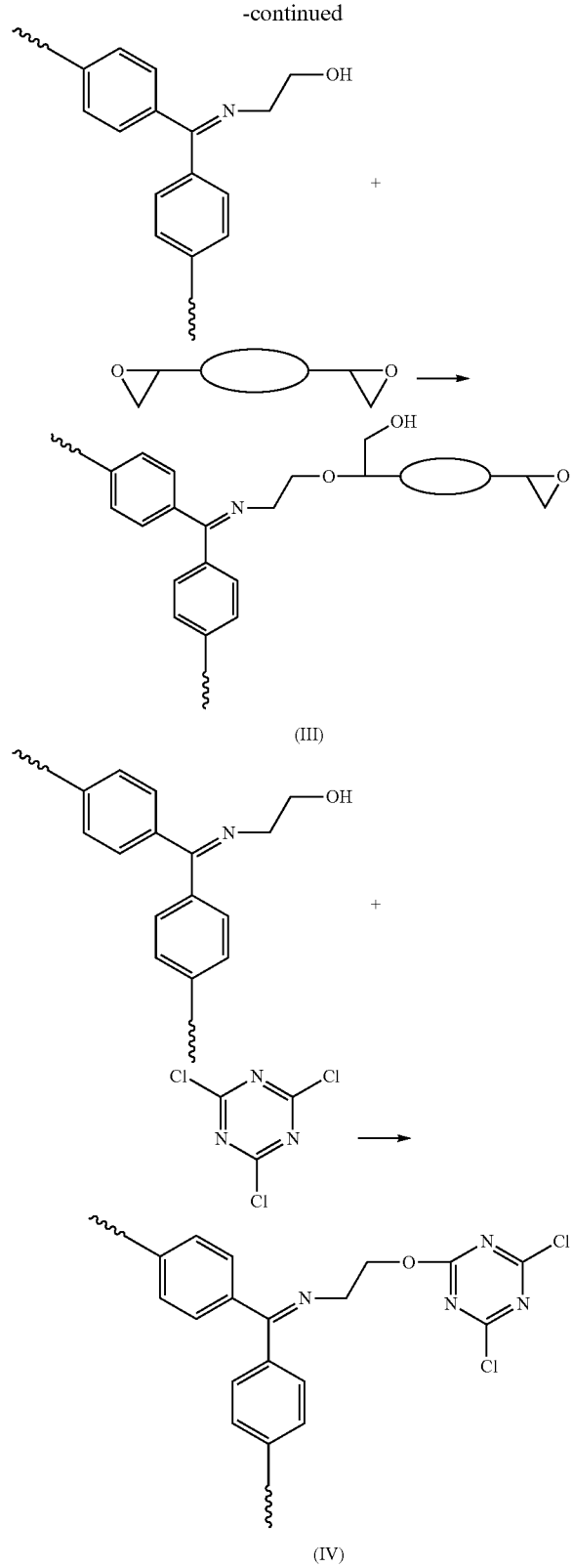

The functional extender groups are then in turn are reacted with functional perfluorohydrocarbons to form membranes of present invention.

In one embodiment the preparation of porous PAEK substrate and its surface modification are carried out simul- taneously. Namely, if the porous PAEK article is formed by the RPR process utilizing a primary amine, the reaction can be carried out under conditions that affect both the formation of the porous PAEK article and the modification of the porous PAEK article via ketimine group formation in a single step process. Carrying out the RPR process at elevated temperatures, preferably above 80° C., most preferably from about 100° C. to about 120° C., in an anhydrous reaction media while utilizing a high concentration of amine reagent, leads to the formation of a porous and functionally modified PAEK substrate in a single step. In one such example, porous PEEK substrate modified with =C=N—CH$_2$CH$_2$OH groups is formed in a single step process from PEEK/PEI blend by reacting the precursor blend article with neat monoethanolamine at about 120° C.

In some embodiments, it is desirable to form unmodified porous PAEK articles by the RPR process from PAEK/PI blends. The unmodified PAEK article is than functionalized by reacting with a target primary amine. To form an unmodified porous PAEK article by the RPR process the precursor PAEK/PI blend article is contacted with the primary amine under conditions that suppress ketimine group formation, i.e. at moderate temperatures and in a relatively dilute amine solution that preferably further contains water. It will be recognized by those skilled in the art that by selecting balanced reaction conditions the PAEK modification via formation of imine linkages can be largely suppressed while an adequately high rate of PI phase decomposition is still maintained. For example, the RPR process can be carried out monoethanolamine/dimethylformamide/water mixture 20/70/10 by volume at 80° C. that provides for a high rate of porous PAEK article formation while suppressing functionalization via the imine group formation. The preferred reaction temperature is from about 70° C. to about 100° C.

The unmodified porous PAEK articles prepared as described above can be modified by reducing surface ketone groups to form hydroxyl groups or by reacting with primary amine reagents to impart target functionality. The modification can be performed throughout the porous structure or carried out selectively at the surface of the porous article only. The application requirements determine the mode of the modification and the functionality of the modifying agent.

The functionalization process of this invention further provides for preparation of composite membranes with an ultra-thin graft separation layer. The process can be carried out under a condition that localizes the modification to the surface region only. For example, composite membranes can be formed utilizing preformed porous PAEK substrate by carrying out the functionalization process under conditions that prevent occlusion of the reactant graft molecules into the porous substrate. The occlusion can be limited by utilizing reactants with a molecular weight which is higher than the molecular weight cut-off of the porous substrate. Composite membranes with an ultra-thin polymeric layer can thus be formed. Alternatively the graft composite membrane with an ultra-thin polymeric layer can be formed by first depositing a thin graft separation layer on top of a dense substrate prepared from PEEK/PEI blend and then removing the PEI phase in a subsequent step by selectively decomposing and removing PEI polymer to form the porous sub-layer structure. The grafting on top of the dense substrate prevents the occlusion of the graft layer material into the porous structure and facilitates the formation of the ultra-thin separation layer. The following three-step process is thus typically utilized to prepare the graft composite membrane. First a precursor of a desired shape, such as hollow fiber, is formed form the PEEK/PEI polymer blend by melt processing. In the second step, a graft perfluoropolymer separation layer is formed on top of the precursor. In the third step, the PEI component is removed by decomposing the PEI polymer into low molecular weight, highly soluble fragments by contacting the precursor with aliphatic amine, such as monoethanolamine, thus forming the porous structure underneath the separation layer. Since the porous structure is developed after the separation layer is formed the occlusion of the substrate by the graft molecules is prevented and an ultra-thin separation layer of graft polymer is formed.

The PAEK membranes of present invention can be also prepared by depositing a perfluoropolymer layer directly onto unmodified porous PAEK substrate or onto PAEK substrate grafted with perfluorohydrocarbons. The perfluoropolymer layer can be deposited by solution coating or laminated by molding. Examples of perfluoropolymers useful in preparation of such composite membranes include copolymers of 2,2-bis(trifluoromethyl)-4,5-difluoro-1,3-dioxole (BDD) and tetrafluoroethylene (TFE), fluoro-5-trifluoromethoxy-1,3-dioxide based polymer and poly(perfluorobutenyl vinyl ether). It was found that composite membranes with dense ultra-thin defect free separation layers can be formed by solution coating porous PAEK substrates grafted with perfluorohydrocarbon. The PAEK substrates with surface pore size below 20 nm are particularly useful in preparation of composite membranes with defect free ultra-thin surface layers. The coating layers are essentially non-occlusive and thus exhibit improved gas transport characteristics. The coating layers are preferably 0.5 micron thick or less, and most preferably 500 Å thick or less. Ultra-thin defect free layers can be also formed by coating PAEK substrates containing reactive functional groups with a mixture of perfluoropolymer and functional oligomer. The oligomer reacts with functional groups on the surface of PAEK substrate and thus improves coating adhesion.

The surface modification and pore size adjustment by grafting can be conveniently carried out without altering PAEK substrate morphology since the substrate is solvent resistant. The separation characteristics of the graft membranes, such as molecular weight cut off can be tailored by employing functional oligomers and polymers of different molecular weight. The separation layers of conventional composite membranes are prone to delamination and the long term, durability and chemical stability of these membranes in aggressive solvent media is a concern. The perfluorohydrocarbon separation layer of membranes of present invention is chemically grafted to the PAEK substrate and thus does not delaminate and exhibits superior durability in aggressive organic solvent systems.

The perfluorohydrocarbon modified porous PAEK membranes exhibit low surface energy and are thus essentially hydrophobic. Even porous membrane with relatively large pore size of up to 1 micron do not wet out with water based solutions. These properties make such membranes most useful for the preparation of porous membranes for gas-liquid transfer devices in water based systems, i.e. membrane contactors. The PAEK membranes with pore diameter below 100 nanometer when modified with perfluorohydrocarbon groups exhibit exceptionally high water bubble point and do not wet out with alcohols. These properties make such membranes most useful for the preparation of porous membranes for gas-liquid transfer devices, i.e. membrane contactors, and as membrane distillation devices. For example, membrane with average pore diameter of 20 nm exhibits water bubble point above 400 psig and is particularly suited for contactor membranes that process alcohol based feed solutions. It was found surprisingly that oleophobic PAEK membranes can generate concentrated alcohol product from dilute ethanol feed solution in a single step membrane distillation process. Thus these membranes can be utilized to recover/remove alcohols such as methanol, ethanol, isopropanol or butanol, from fermentation solutions. The alcohol is recovered by applying vacuum or a sweep gas to the permeate side of the membranes. The alcohol can be also recovered by absorption into a liquid (strip solution) such as oleic acid or dodecanol. The membranes with dense perfluorohydrocarbon layers do not wet out with hydrocarbons and can be utilized as membrane contactors for processing hydrocarbon fluids.

The porous poly(aryl ether ketone) based membranes of this invention can be utilized in numerous fluid separation applications, such as microfiltration, nano-filtration, membrane distillation, gas separations, and as membrane contactors. The fluid separation method typically involves contacting a feed fluid with the membrane of this invention under conditions that sustain a pressure differential across the membrane (or a partial pressure differential in the case of gas components). The pressure differential can be generated be pressurizing feed fluid, or by applying vacuum or a sweep gas to the permeate side. At least a fraction of the feed mixture is allowed to permeate through the membrane and the remaining fraction of the fluid is collected as a non-permeate. In the process of the permeation, the permeate fraction is enriched in a fast permeating component and the non-permeate fraction of the feed mixture is depleted in this component. The component or components can be in the form of a solute or gas dissolved in the feed fluid, a gaseous component being a part of a gas mixture, or as a solid matter suspended in the feed fluid. Further more, the fluid separation method can be a counter-current flow process, tangential flow filtration process, a cross flow filtration process or a dead-end filtration process. The membranes of this invention containing a dense ultra-thin perfluoropolymer separation layer can be utilized for gas separations such as oxygen/nitrogen separation, natural gas sweetening, for hydrocarbon recovery from air or natural for hydrogen recovery from petrochemical and refinery streams and gas dehydration applications including alcohol/water separation. These membranes can be also utilized s contactor membrane to remove gases from liquids or for controlled dissolution of gases into liquids.

Membranes of this invention that do not wet out with low surface tension liquids can be utilized as contactors to remove dissolved or suspended water from fluids including hydraulic fluid, oils such as the transformer oil, and diesel fuels, in particular the bio-diesel. These contactor membranes can be further utilized to remove dissolved gases such as oxygen from liquids including water based solutions and organic solvents such as jet fuel.

The present invention is described below by examples, which should not be construed as limiting the present invention.

EXAMPLES

Preparative Example 1

This preparative example describes preparation of porous PEEK substrate modified with hydroxyl groups in a single step pore formation surface modification process.

A precursor 25μ thick film was obtained by compression molding PEEK/PEI blend (50:50 by weight pre-blended in a twin extruder) at ca. 370° C. followed by quenching in water. The film was then heat treated at 250° C. for 1 hour to affect crystallization of PEEK polymer. The film was then placed into neat monoethanolamine solution maintained at 120° C. for 4 hours. The solution was blanketed with nitrogen. The thus formed porous PEEK film was washed with IPA and then Soxlet extracted with methanol overnight. The porous film was then dried under vacuum at 80° C. overnight. The elemental analyses indicated that the film contained 1.26% of nitrogen. No residual polyimide was detected by FT-IR analyses. The nitrogen presence was attributed to formation of imine groups.

Preparative Example 2

This preparative example describes preparation of porous PEEK substrate without surface modification.

A precursor film was obtained by compression molding PEEK/PEI bled (50:50 by weight pre-blocked in a twin extruder) at ca. 370° C. followed by quenching in water. The film was then heat treated at 250° C. for 1 hour to affect crystallization of PEEK polymer. The film was then placed into solution comprised of DMF, monoethanolamine and water 90/5/5 by volume at 100° C. for 4 hours. The solution was blanketed with nitrogen. The thus formed porous PEEK film was washed with IPA and then Soxlet extracted with methanol overnight. The porous film was then dried under vacuum at 80° C. overnight. The elemental analyses indicated that the film contained 0.09% of nitrogen. No residual polyimide was detected by FT-IR analyses. The results indicate that thus obtained porous PEEK substrate is essentially free of surface modification via imine group formation.

Preparation Example 3

This preparative example demonstrates preparation of PEEK substrate functionalized with hydroxyl groups by selective reduction of surface ketone groups.

A porous PEEK film prepared as described in Preparative Example 2 was pre-dried under vacuum at 100° C. overnight. The pre-dried film was then placed into a 0.1% sodium borohydride solution in isopropyl alcohol and refluxed for 8 hours. The film was then washed sequentially with dilute HCl solution (0.1N) and distilled water and then dried under vacuum at 80° C. to a constant weight. The thus obtained film was found to be highly hydrophilic and spontaneously wetted with water.

Example 4

This example demonstrates preparation of super-hydrophobic membranes of this invention by surface grafting.

A porous PEEK film prepared as described in Preparative Example 1 that contained surface hydroxyl groups was first dried under vacuum at 100° C. overnight. The pre-dried film was then dipped into 1% solution of functional perfluorohydrocarbon PFC 504A/COE5 obtained from Cytonix Corporation. The dip coated porous membrane was air dried followed by heat treatment at 90° C. for 2 hours. The thus obtained porous membrane was found to be highly hydrophobic and did not wet out by isopropanol at room temperature. The membrane exhibited high gas permeance (He permeance 5400 GPU) and He/N$_2$ separation factor of 2.6. {GPU=1×10$^{-6}$ cm$^3$ (STP)/cm$^2$·s·cmHg}.

Example 5

This example demonstrates preparation of super-hydrophobic membranes of this invention by modifying PEEK substrate first with hydroxyl groups followed by surface grafting with perfluorohydrocarbons.

A porous PEEK substrate film that contained hydroxyl surface groups formed by selective ketone group reduction was prepared as described in Preparative Example 3. The film was pre-dried under vacuum at 100° C. overnight. The pre-dried film was then dipped into the 1% solution of functional perfluorohydrocarbon EEC 504A/COE5 obtained from Cytonix Corporation. The coated porous membrane was air dried and then further heat treated at 90° C. for 2 hours. The thus obtained porous membrane was found to be highly hydrophobic and did not wet out by isopropanol at room temperature. The membrane exhibited high gas permeance (He permeance 5600 GPU) and He/N$_2$ separation factor of 2.6. {GPU=1×10$^{-6}$ cm$^3$ (STP)/cm$^2$·s·cmHg}.

Example 6

This example demonstrates preparation of composite superhydrophobic membrane of present invention.

A precursor PEEK hollow fiber was obtained by melt extrusion of PEEK/PEI blend (50:50, by weight). The precursor hollow fiber had 16 mil outside diameter and 11 mil inside diameter. The hollow fiber was heat treated at 250° C. for 1 hour and then placed for 8 hours into monoethanolamine maintained at 100° C. The porous hollow fiber was washed with IPA and then with water. The porous hollow fiber was dried at 80° C. under vacuum overnight. The hollow fiber was then treated with 1% solution of PFC 504A/COE5. The treated hollow fiber was then subjected to heat treatment at 90° C. for 2 hours. The thus prepared porous hydrophobic hollow fiber was further dip coated with 1% solution of Hyflon AD60 polymer dissolved in PF589 perfluorinated solvent obtained from Solvay and 3M Corporations, respectively. The composite membrane prepared by this process was highly hydrophobic and did not wet out by cyclohexane. The membrane exhibited high oxygen permeance of 190 GPU an oxygen/nitrogen separation factor of 2.9.

Example 7

This example demonstrates selective recovery of ethanol from ethanol/water solutions by the super-hydrophobic membrane of this invention.

A precursor PEEK hollow fiber was obtained by melt extrusion of PEEK/PEI blend (50:50, by weight). The precursor hollow fiber had 16 mil outside diameter and 11 mil inside diameter. The hollow fiber was heat treated at 250° C. for 1 hour and then placed for 8 hours into monoethanolamine maintained at 100° C. The thus formed porous hollow fiber was washed with IPA and then with water. The porous hollow fiber was dried at 80° C. under vacuum overnight. The hollow fiber was then treated with 1% solution of PEC 504A/COE5. The treated hollow fiber was then subjected to heat treatment at 90° C. for 2 hours. The thus obtained hydrophobic hollow fiber membrane was utilized to separate ethanol from water.

The ethanol/water separation was carried out utilizing hollow fiber module equipped with hydrophobic hollow fibers. The module was 14 inch long and contained about 30 hollow fibers. The feed solution (10% ethanol/water by weight) was circulated through the shell side of the hollow fiber module and the permeate vapor was collected on the bore side of the membrane by condensing in a dry ice trap. The driving force was generated by applying vacuum on the permeate side (the vacuum was maintained at about 0.2 atm). The ethanol concentration in the permeate was measured by the refractive index and the membrane flux was measured gravimetrically based on the weight of the liquid collected. The membrane exhibited ethanol flux of 0.05 kg/m² hour and ethanol/water separation factor of 80 at room temperature. The separation factor ($\alpha$) of ethanol relative to water is defined as the ratio of permeate compositions divided by the ratio of the feed compositions as follows:

$$\alpha_{ethanol/water} = \frac{(C^p_{ethanol}/C^p_{water})}{(C^f_{ethanol}/C^f_{water})}$$

Wherein $C^p_{ethanol}$ is the ethanol concentration in the permeate, $C^p_{water}$ is the water concentration in the permeate, $C^f_{ethanol}$ is the ethanol concentration in the feed, and $C^f_{water}$ is the water concentration in the feed.

While this invention has been particularly shown and described with references to preferred embodiments thereof, it will be understood by those skilled in the art that various changes in form and details may be made therein without departing from the scope of the invention encompassed by the appended claims.

What is claimed is:

1. A process for preparing a composite membrane, the process comprising:
    a. forming a blend of poly(aryl ether ketone) polymer with a polyimide;
    b. shaping the blend to form a shaped substrate;
    c. optionally annealing the shaped substrate;
    d. bringing the shaped substrate into contact with a primary amine to decompose the polyimide into low molecular weight fragments while functionalizing the poly(aryl ether ketone) with the primary amine;
    e. removing the low molecular weight fragments from the substrate to form a porous poly(aryl ether ketone);
    f. washing the porous poly(aryl ether ketone) substrate;
    g. drying the porous poly(aryl ether ketone) substrate; and
    h. grafting the porous poly(aryl ether ketone) substrate with a perfluorohydrocarbon, thereby forming the composite membrane.

* * * * *